United States Patent [19]
Honigsbaum

[11] Patent Number: 6,058,957
[45] Date of Patent: May 9, 2000

[54] WATER SAVER FIRE HYDRANT

[76] Inventor: Richard Honigsbaum, A-21 Barry Gardens 241 Passaic Ave., Passaic, N.J. 07055

[21] Appl. No.: 09/148,359

[22] Filed: Sep. 4, 1998

Related U.S. Application Data

[60] Provisional application No. 60/058,182, Sep. 8, 1997.

[51] Int. Cl.[7] .................................................. F16K 35/00
[52] U.S. Cl. ...................... 137/1; 137/272; 137/630.15; 251/92; 251/94
[58] Field of Search .................. 137/1, 272, 630.15; 251/92, 94

[56] References Cited

U.S. PATENT DOCUMENTS

| | | |
|---|---|---|
| 3,650,471 | 3/1972 | Sutton . |
| 4,716,922 | 1/1988 | Camp . |
| 5,469,724 | 11/1995 | Pollard . |
| 5,520,210 | 5/1996 | Barton . |
| 5,549,133 | 8/1996 | Sigelakis . |
| 5,588,460 | 12/1996 | Meneses . |
| 5,596,893 | 1/1997 | Stehling et al. . |
| 5,622,202 | 4/1997 | Etter et al. . |

OTHER PUBLICATIONS

*AWA Standard for Dry Barrel Fire Hydrants*, ANSI/AWWA C502–85, Denver, 1985.

*Installation, Field Testing, and Maintenance of Fire Hydrants*, AWWA Manual M17, Third Edition, Denver, 1989, pp. 94 and 95.

*Primary Examiner*—Gerald A. Michalsky
*Attorney, Agent, or Firm*—Cohen, Pontani, Lieberman & Pavane

[57] ABSTRACT

Water saver fire hydrants save water by delivering their initial flow from a pilot valve to a collection of holes in the gasket faces of their hose and pumper outlet nozzles. These holes are normally closed off by the gaskets in caps and hoses, and the water that flows from those holes in the absence of those caps or hoses activates a mechanism inside the hydrant that either blocks attempts to obtain full flow from the hydrant or powers a hydraulic motor that closes the hydrant valves.

40 Claims, 5 Drawing Sheets

WATER SAVER FIRE HYDRANT

This application claims the benefit of provisional application Ser. No. 60/058,182, filed Sep. 8, 1997.

BACKGROUND OF THE INVENTION

1. Field of the Invention

This invention relates to fire hydrants and more particularly to fire hydrants that discourage unauthorized use.

2. Description of the Related Art

Fire hydrants are installed in water systems to provide water at the pressures and flow rates needed for fire fighting, but when hydrants are opened illicitly, say for recreational purposes during the heat of summer, not only does the resulting flow flood streets, undermine infrastructure and put the lives of children at risk; it also reduces pressures and flow rates to levels too low for effective fire fighting.

Fire hydrants intended to discourage this unauthorized use are familiar from the patent literature, and examples include Barton, U.S. Pat. No. 5,520,210; Camp, U.S. Pat. No. 4,716,922; Etter et al., U.S. Pat. No. 5,622,202; Meneses, U.S. Pat. No. 5,588,460; Pollard, U.S. Pat. No. 5,469,724; Sigelakis, U.S. Pat. No. 5,549,133; Stehling et al., U.S. Pat. No. 5,596,893, and Sutton, U.S. Pat. No. 3,650,471.

Barton and Meneses teach hydrants that are intended to be operated only with special mechanical wrenches, but such hydrants have also been opened with improvised versions of these wrenches. Camp and Stehling teach hydrants that are intended to be operated only with special magnetic wrenches, but such hydrants have also been opened with the combination of loudspeaker magnets and conventional wrenches. Pollard and Sigelakis teach external hydrant locking devices intended to deny illicit access to water, but these devices have been smashed to gain access to that water. Etter teaches a hydrant that is opened or closed by pumping fluid from an external source to a turbine inside the hydrant, and Sutton teaches an arrangement having an auxiliary valve that provides a recreational spray even with the main valve closed. Sutton does not, however, include means for limiting the flow to only that spray during unauthorized use.

Other relevant literature includes the American Water Works Association (AWWA) publications *AWWA Standard for Dry Barrel Fire Hydrants,* ANSI/AWWA C502-85, Denver, 1985, §3.2.1, 3.2.1.2, 3.2.11 and 3.2.9.1 in particular; *AWWA Standard for Wet Barrel Fire Hydrants,* ANSI/AWWA C503-82, Denver, 1982; and *Installation, Field Testing, and Maintenance of Fire Hydrants,* AWWA Manual M17, Third Edition, Denver, 1989. Pages 94 and 95 of Manual M17 show the internal details of *U.S. Pipe & Foundry Co. Series H Hydrant with Pilot Valve for Higher Pressures,* an arrangement of particular relevance here.

SUMMARY OF THE INVENTION

According to this invention, I have developed both dry-barrel and wet-barrel fire hydrants that operate conventionally when a hose is attached, but deliver no more than a token flow of water when an outlet nozzle cap is removed and no hose or other authorized device is attached.

According to this invention, water is initially delivered via a dedicated flow path to a series of holes in the gasket faces of the hydrant outlet nozzles. These holes are normally closed off by the gaskets in caps and hoses, but when they are not, the flow via that path either activates a mechanism that blocks further attempts to obtain full flow from the hydrant or powers a hydraulic motor that closes the hydrant valves.

According to a first preferred embodiment of this invention, the hydrant has two sequentially opened valves that share a common stem. The first to open and the last to close is a pilot valve that, when opened, delivers water from that valve to the series of holes in the gasket faces of the hydrant outlet nozzles, and the last to open and the first to close is a main valve that delivers full flow to the hydrant outlet nozzles. The hydrant also includes an internal mechanism that blocks attempts to open the main valve when water flows from the holes in those gasket faces nozzles because the pilot valve has been opened and one or more of those nozzles is bare (i.e., a nozzle has no cap, hose, or other authorized device attached).

According to the first preferred embodiment of this invention, that internal mechanism is a blocking pin actuator that responds to the pressure drop across an orifice in the dedicated path by extending a pin that blocks further movement of the common stem in the direction that would otherwise open the main valve.

According to a second preferred embodiment of this invention, the pin engages a finger plate that prevents further rotation of the valve stem nut in the direction that opens the main valve.

According to a third preferred embodiment of this invention, the pin serves the pawl function in a pawl-and-ratchet arrangement that prevents further rotation of the valve stem in the direction that opens a main valve.

According to a fourth preferred embodiment of this invention, the blocking pin actuator responds to the pressure difference between an upstream facing (impact) tube and a downstream facing (diffusion) tube in a venturi portion of the dedicated flow path rather than to the pressure drop across an orifice. This arrangement delivers a satisfying recreational spray from the holes in the gasket faces of bare outlet nozzles in lieu of full flow which is, of course, unavailable when hydrants in accordance with the present invention are uncapped.

According to a fifth preferred embodiment of this invention, the dedicated flow path also includes a hydraulic motor that responds to flow via that path by closing the hydrant valves.

The fire hydrants of the present invention offer several important benefits unavailable with prior art traditional hydrants that deliver full flow during unauthorized use. A partial listing of these benefits follows.

(1) Hydrants that are opened illicitly during the heat of summer will no longer waste so much water that none is available for fire fighting.

(2) Illicitly opened hydrants will no longer flood streets and damage or destroy infrastructure.

(3) The risk of a child being injured, or worse, being swept into the path of a motor vehicle or into a storm drain, or being drowned by the full flow from open hydrants is eliminated.

(4) Firefighters who, because of the force exerted by the full flow from illicitly opened traditional hydrants cannot attach hoses to those hydrants without first closing them down, will not, because of the reduced flow, have to do so here. The time saved thereby can save not only property, it can also save lives.

The various features of novelty which characterize the invention are pointed out with particularity in the claims annexed to and forming a part of the disclosure. For a better understanding of the invention, its operating advantages, and specific objectives attained by its use, reference should be had to the drawings and descriptive matter in which there are illustrated and described preferred embodiments of the invention.

DETAILED DESCRIPTION OF THE PRESENTLY PREFERRED EMBODIMENTS

Figure 1:
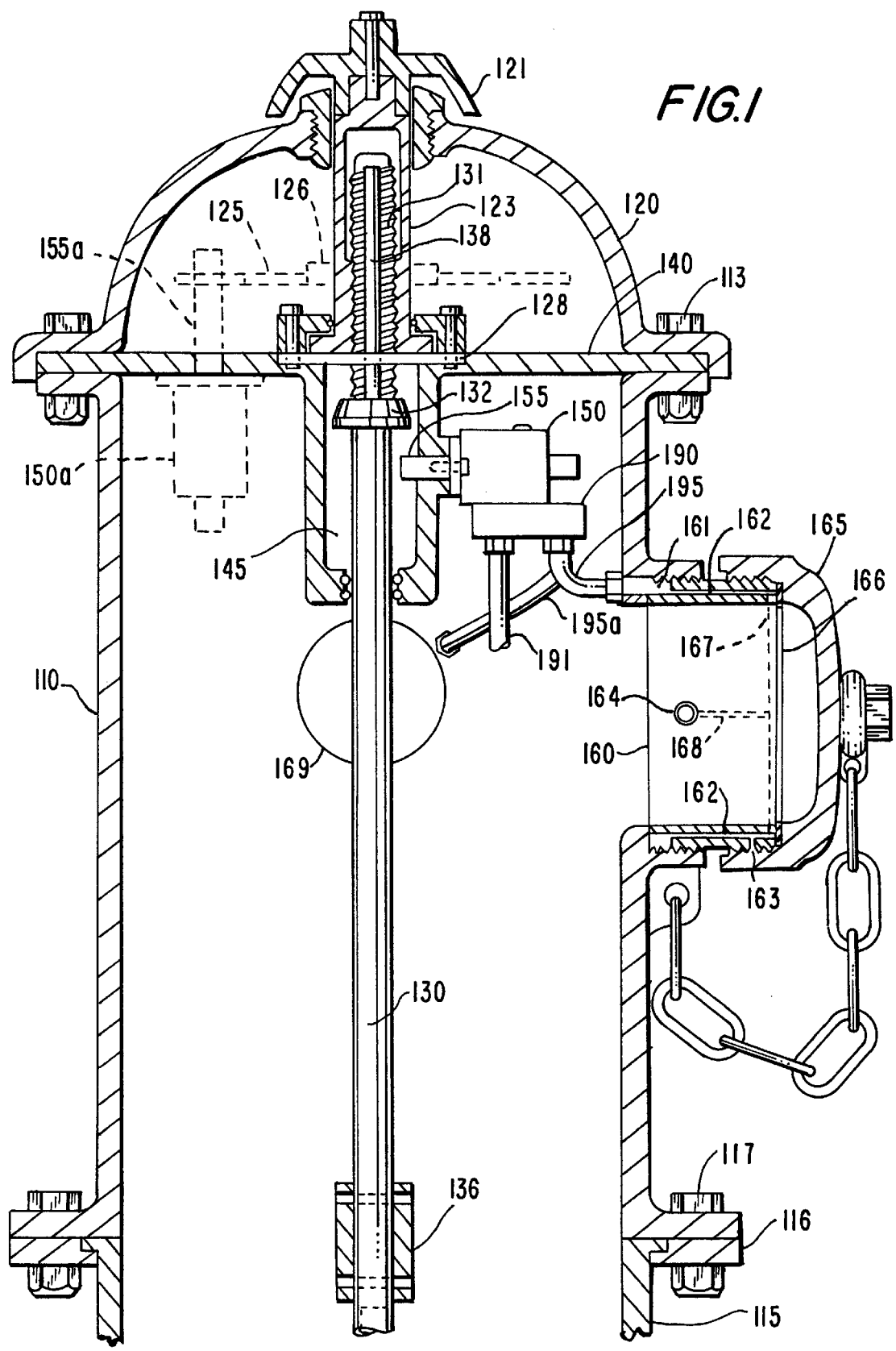
FIG. 1 is a sectional elevational view of the upper barrel and bonnet portions of a dry-barrel fire hydrant in accordance with the present invention, and in which a blocking pin actuator and its flow sensor are shown.
Figure 2:
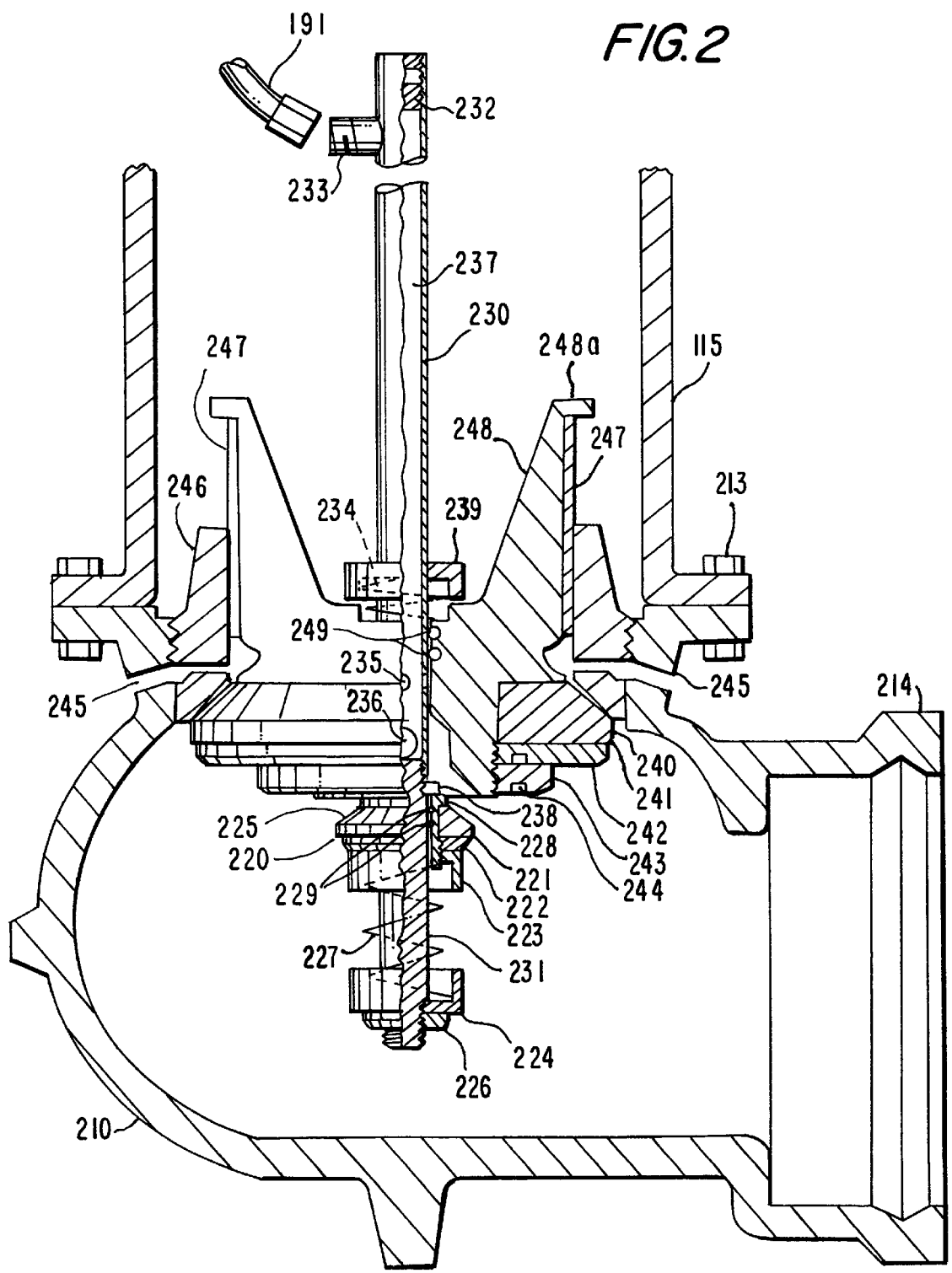
FIG. 2 is a sectional elevational view of the base and lower barrel portions of a dry-barrel fire hydrant in accordance with the present invention, and in which the pilot valve is shown opened and the main valve is shown closed.

Turning now to the drawings, the embodiment of FIG. 1 is the upper barrel portion 110 and the bonnet portion 120 of a fire hydrant in accordance with this invention, the embodiment of FIG. 2 is the base portion 210 and the lower barrel portion 115 of that hydrant, and the embodiment of the combination of FIGS. 1 and 2 is a traffic-model compression-type dry barrel water saver fire hydrant The hydrant is connected to a water main by a hydrant lead that mates with flange 214.

Bonnet 120 and seal plate 140 are secured to upper barrel 110 with conventional bolts 113 and lower barrel 115 is secured to base 210 with conventional bolts 213, but upper barrel 110 is secured to lower barrel 115 with breakable bolts 117 and a breakable flange 116, and the breakable bolts and flange along with frangible stem coupling 136 make the hydrant a traffic model. While gaskets are normally installed between the parts mentioned (and elsewhere where appropriate), they have been omitted from the drawings to reduce clutter, and are shown only where needed for purposes of explanation.

The hydrant is operated with a conventional pentagonal operating wrench that mates with the pentagonal operating nut portion of combination operating nut and weather shield 121, and the operating nut mates with stem nut 123. Thus counterclockwise rotation of the operating wrench moves the two-part stem downward, and that downward movement opens the hydrant as is explained with reference to FIG. 2.

The lower stem 230 of FIG. 2 has a hollow portion 237 that is closed at the top by threaded plug 232 and at the bottom by solid pilot valve stem 231 the upper end of which is threaded for the purpose, and has drain holes 235 that drain hollow portion 237 when the hydrant is closed. Lower stem 230 also has flooding holes 236, and flooding holes 236 and drain holes 235 are arranged to lie on either side of "o" rings 249 to avoid deforming these rings when the hydrant is closed.

As the stem is moved downward, pilot valve spring 227 holds pilot valve 225 of pilot valve assembly 220 against upper main valve plate 248, which is also the pilot valve seat, until drain holes 235 are moved to a position below "o" rings 249, pilot valve collar 238 contacts pilot valve assembly 220 and opens the pilot valve, flooding the hollow portion 237 of lower stem 230 via flooding holes 236.

This pilot valve opening sequence keeps the water entering flooding holes 236 from exiting at drain holes 235, flooding the hydrant barrel, exiting the barrel via drain holes 245, and saturating the surrounding soil and undermining the hydrant. Where soil saturation is of no concern, or where drain holes 235 can be eliminated because freezing is of no concern, pilot valve 225 can be fixedly secured to lower stem 230 as is pilot valve 575 of FIG. 5.

Lower stem 230 can, in combination with holes 235 and "o" rings 249, also serve as its own spool or sleeve type pilot valve. Drain holes 235 move as mentioned, i.e., from the "dry" side of "o" rings 249 to the "wet" when the stem is moved downward, and with flooding holes 236 eliminated and drain holes 235 increased in number, size, or both to accommodate the expected flow, holes 235 would serve as drain holes when they are above "o" rings 249, and as flooding holes when below. Thus valve 225 and its associated parts could be eliminated, main valve 240 being held closed. mechanically when the hydrant is closed by a suitably modified version of collar 238. Valve 225 is, however, preferably retained, fixedly secured to lower stem 230, say in an arrangement like that of FIG. 5, and converted in function to that of a seal valve that both isolates "o" rings 249 from the water supply and holds the main valve closed mechanically when the hydrant is closed, the pilot valve function being served by lower stem 230, holes 235, and "o" rings 249 as explained.

The seal valve arrangement is preferred because "o" rings suffer additional wear when they are traversed by holes, holes large enough to serve the dual role in particular, and worn rings can leak. That leakage is, however, of no consequence when hydrants are open, and will be prevented by the seal valve when hydrants are closed. Thus ring replacement can be scheduled for times when the weather is cooperative, rather than having to be done on an emergency basis in the dead of winter to prevent freeze damage to a hydrant and its surroundings.

The water that floods into hollow portion 237 of lower stem 230 as the hydrant is opened is delivered to flow sensor 190 of FIG. 1 via flexible conduit 191, say a length of armored hose, that is also connected to the lower stem nipple 233 of FIG. 2, and the water that exits flow sensor 190 is delivered to a ring manifold 161, formed by cutting away part of the inboard threads of hydrant outlet nozzle 160, via preferably rigid conduit 195, and ring manifold 161 in turn delivers water that flows from the longitudinal holes 162 in outlet nozzle 160 when cap 165 and the gasket 166 attached thereto is removed from that nozzle and no hose or other authorized device is attached. Nozzle 160 is also shown as having at least one optional radial hole 163 in the threaded portion of nozzle 160 to help drain that nozzle as the hydrant is closed.

The ring manifold arrangement described is facilitated by the screw-in outlet nozzle configuration shown. Outlet nozzles can, however, also be secured to hydrants by means such as locking rings, retaining rings, set screws, caulking and leading etc., and when they are, persons having ordinary skill in the art will recognize that ring manifolds must be modified accordingly. Such persons will also recognize that at least a portion of the flow path via conduits 191, 195 can alternately be via passages cored into hydrant barrels for the purpose.

FIG. 1 shows one outlet nozzle 160 in detail, but fire hydrants traditionally have three outlet nozzles, one for a pumper and two for hoses, and one hose outlet nozzle, 169, is shown. (The other is in the part of the sectional elevation that was cut away). These hose outlet nozzles are also served by conduits corresponding to, and in flow parallel with, conduit 195, one of which, conduit 195*a,* branches off the downstream side of flow sensor 190. Nozzle 169 also has a manifold corresponding to ring manifold 161, and holes corresponding to longitudinal holes 162 and optional radial holes 163, but these additional details have been omitted because they would merely add clutter to the drawing and contribute nothing to explanation.

The flow path from the pilot valve via the hollow portion 237 of lower stem 230, nipple 233, conduit 191, flow sensor 190, conduit 195, ring manifold 161, and longitudinal holes 162 to the downstream end of holes 162, 163, and the corresponding connections to, and parts of, the hose outlet nozzles comprise the dedicated flow path referred to elsewhere herein, and flow via that path activates blocking pin actuator 150, as is best explained with reference to FIG. 3.

Figure 3:
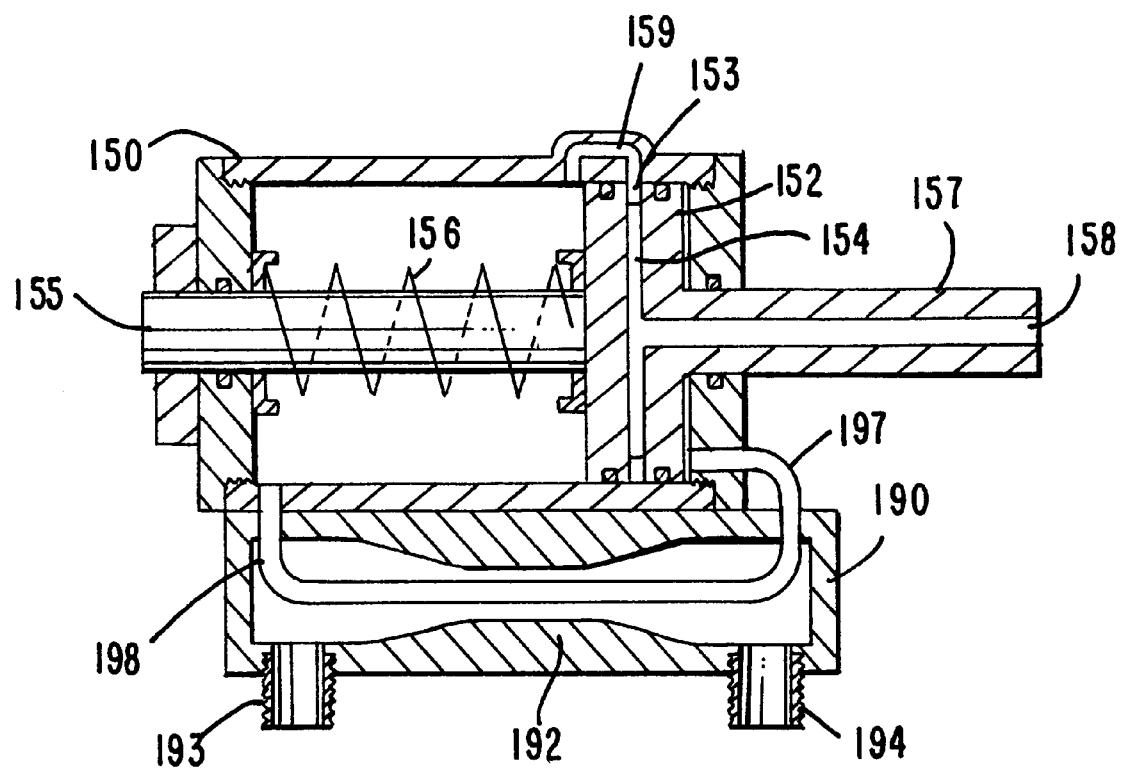
FIG. 3 is a sectional elevational view of the blocking pin actuator and a venturi type flow sensor in accordance with the present invention.

The embodiment of FIG. 3 has a flow sensor 190 having a venturi section 192, an inlet fitting 193 to which conduit 191 of FIG. 1 is attached, and an outlet fitting 194 to which conduit 195 of FIG. 1 is attached. Sensor 190 also has an impact (upstream facing) tube 197 and a diffusion (downstream facing) tube 198, each connected to the cylinder chamber on one side or the other of piston 152 of blocking pin actuator 150, as shown. When the pressures sensed by impact and diffusion tubes 197, 198 are the same, whether because caps or other attachments or their gaskets close off the holes in the outlet nozzles or because the pilot valve is closed, the pressures on either side of piston 152 are the same, and blocking pin 155 is moved to, and held in, the unblocked position by spring 156. Assuring the outlet nozzle holes 162, 163 to be closed off as mentioned, stem 130 can be moved downward until the collar 239 of FIG. 2 opens main valve 240, and the downward movement of stem 130 is stopped by the bottoming out of stop 132 (a nut, a collar, etc.) against the bottom of the lubricant chamber 145 of seal plate 140. If, however, the pilot valve is open and an outlet nozzle is bare, water flowing through venturi 192 will put higher pressure on the right-hand side of piston 152 than on the left, and blocking pin 155 will be moved to the left and block both further downward movement of stem 130 and the opening of main valve 240.

Blocking pin actuator 150 also has what appears to be a second pin 157 having an axial hole 158 that communicates with a circumferential groove 153 in piston 152 via one or more radial holes 154, and a bridge 159 that connects the left chamber of that actuator to groove 153 when piston 152 is in the position shown. This arrangement introduces air at the highest point in the dedicated flow path when the hydrant valves are closed, and facilitates drainage of that path. Where winters are mild enough so that freezing is of no concern, the drainage provisions of FIG. 3 can be omitted, or a blocking pin arrangement like that of FIG. 5, but having a piston without the holes 599, can be substituted for actuator 150.

The venturi-type flow sensor of the FIG. 3 embodiment is intended to provide a recreational spray from the holes in the gasket faces of bare outlet nozzles as a preferred alternative to the full flow from those nozzles that is, of course, unavailable from hydrants in accordance with this invention. Because road-directed spray from a bare pumper outlet nozzle can attract children to the portion of the road in front of the hydrant and into the normal path for vehicles, the holes 162 in the pumper outlet nozzle (and those in other nozzles that face the road as well) are preferably sized such that the total cross-sectional area of the holes in any one of those road-facing nozzles exceeds that of the venturi, while those of outlet nozzles that do not face the road do not. Thus the hydrant will deliver a satisfying spray when the road-facing nozzles are capped, but not when they are bare.

Figure 4:
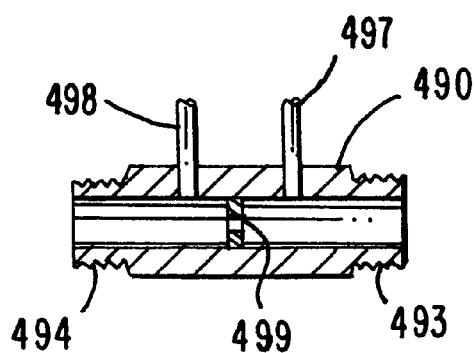
FIG. 4 is a sectional elevational view of an orifice type flow sensor in accordance with the present invention.

This invention can also be practiced without providing a recreational spray, and for such hydrants the flow sensor of FIG. 4 is preferred. In the FIG. 4 embodiment, flow sensor 490 has an inlet 493, an outlet 494, a restriction, here the hole in orifice plate 499, that limits flow via the dedicated flow path, and pressure sampling tubes 497, 498 that replace tubes 197, 198 when the flow sensor of FIG. 4 is substituted for that of FIG. 3.

Operation of blocking pin actuator 150 remains the same when the flow sensor of FIG. 4 is substituted for that of FIG. 3; i.e., blocking pin 155 is held in its retracted position by spring 156 when there is no flow via the dedicated flow path, and is extended when the pressure on the upstream side of orifice plate 499 and communicated to the right-hand side of piston 152 by sampling tube 497 exceeds that on the downstream side and communicated by sampling tube 498 because of the pressure drop across orifice 499 when there is flow.

While the orifices in the flow sensors of the FIG. 4 embodiments can be made small enough so that the blocking pin actuator is activated by an arbitrarily small flow via the dedicated flow path, activation rates corresponding to seepage past aging or otherwise imperfect gaskets could render hydrants in accordance with the present invention useless for their intended purpose of fire fighting. Thus the orifices in the FIG. 4 embodiments are preferably sized to accommodate such seepage without a pressure drop great enough to activate their blocking pin actuators.

The sampling tubes 497, 498 are shown in FIG. 4 as being just upstream and just downstream of orifice plate 499 for purposes of convenience with respect to illustration and explanation, but persons having ordinary skill in the art will recognize that operation will be as described if the upstream pressure is sampled at some other point along the portion of the dedicated flow path upstream of orifice plate 499, the downstream pressure is sampled at some other point along the portion of that path downstream of the orifice, or both are so sampled. Thus the downstream pressure can be sampled say by one or more sampling holes in hydrant outlet nozzle 160, a typical one of which, 168, is shown. Sampling holes 168, drilled or otherwise formed to be indistinguishable from longitudinal holes 162 when viewed from the gasket face of outlet nozzle 160, connect shallow groove 167 in that face with sampling fitting 164, say a threaded nipple, but not with ring manifold 161. Fitting 164 is connected to blocking pin actuator 150, say by a conduit (not shown) that replaces sampling tube 498. While conduits from each of the other outlet nozzles could also be so connected, there is no need to do so when flow via the dedicated flow path is limited by a restriction in that path.

For those applications where the sensing arrangements of FIGS. 3 and 4 are acceptable as drawn, groove 167, holes 168, and fitting 164 and the conduit connected thereto would, of course, be eliminated.

The blocking pin actuator 150 is shown oriented horizontally in FIG. 1, but it can also be oriented vertically as can the flow sensors, and one such arrangement, from which the flow sensor and its associated plumbing have been omitted in the interest of clarity, is shown dotted as actuator 150*a* of FIG. 1. Also shown dotted is radially slotted finger plate 125 and the one-way clutch 126 to which it is secured, the clutch in turn being detachably secured to stem nut 123 to facilitate hydrant repair. In the actuator 150a embodiment, pin 155*a* is extended upward into one of the slots in finger plate 125 to block further rotation of that plate, and thus the opening of the main valve, when flow via the dedicated flow path is sensed. In the absence of such flow, pin 155*a* is held in its retracted position either by gravity alone, or with help from a spring corresponding to spring 156 of FIG. 3. Because pin 155*a* blocks rotation of finger plate 125 in either direction, one way clutch 126 is included to accommodate the closing, but not the opening, of the hydrant valves. Stop 132, it should be noted, is frustroconical to serve an analogous role with respect to pin 155.

Figure 6:
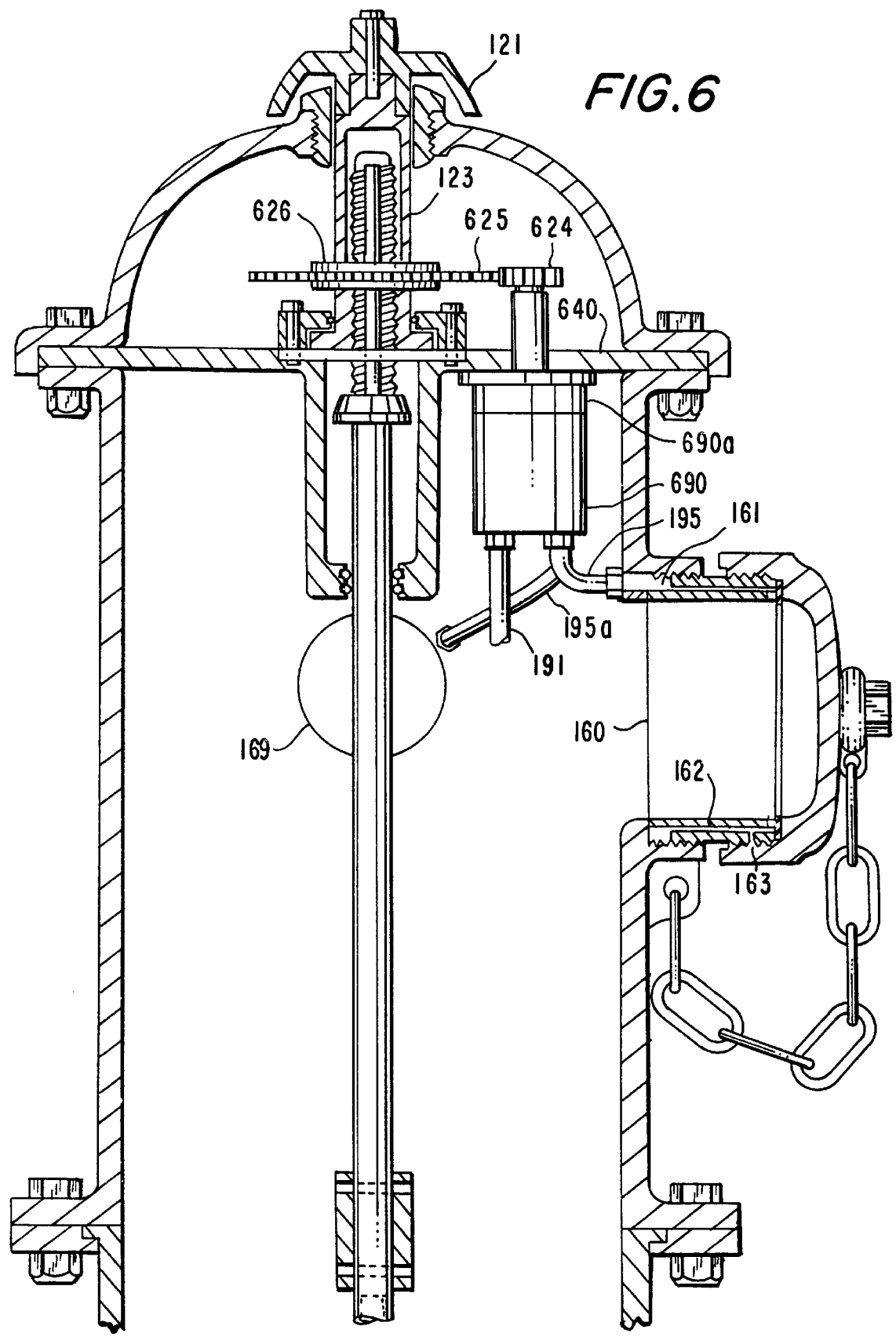
FIG. 6 is a sectional elevational view of the upper barrel and bonnet portions of a dry-barrel fire hydrant in accordance with the present invention, and in which a hydraulic motor type flow sensor is shown.

While the operation of the orifice and the venturi type flow sensors of this invention have been explained, persons having ordinary skill in the art will recognize that flow can also be sensed with vanes or impellers, and one such sensor is the hydraulic motor 690 of FIG. 6.

The embodiment of FIG. 6 shown in the drawing is the now familiar upper barrel and bonnet portion of a fire hydrant in accordance with the present invention, and the embodiment of the combination of FIGS. 2 and 6 is, like the embodiment of the combination of FIGS. 1 and 2, a traffic-model compression-type dry-barrel water saver fire hydrant that is connected to a water main by a hydrant lead that mates with flange 214 of FIG. 2. Because FIGS. 1 and 6 share so many features with respect to both form and function the numerical identifiers of FIG. 1 have also been used for FIG. 6, and any parts shown in FIG. 6 that are not specifically identified here can be identified by referring to FIG. 1 and the descriptions thereof.

Thus the FIG. 2–FIG. 6 embodiment also has a dedicated flow path from the pilot valve of FIG. 2 to the downstream end of the holes 162, 163 of NG. 6 via the hollow portion 237 of lower stem 230, conduit 191, a flow sensor, conduit 195, ring manifold 161 and holes 162, 163, and, where applicable, conduits 195*a* and the ring manifolds and the holes in nozzles 169 fed thereby. Here, however, the flow sensor is either a vane-type hydraulic motor or a turbine 690, and, if the latter, preferably one having a reduction gear 690*a* Motor 690 is secured to seal plate 640, say with bolts (not shown), and is preferably gasketed to prevent leakage into the bonnet when the hydrant is flooded.

Hydraulic motor 690 has a mechanical output shaft that rotates in response to flow, and that also rotates the pinion 624 secured to it. Pinion 624 drives gear 625, and the directions of rotation are such that gear 625, which is coupled to stem nut 123 via slip clutch 626, rotates stem nut 123, closing main valve 240 and also closing the pilot valve to the extent that the loss of flow as the pilot valve closes allows. Slip clutch 626, which is also the carrier for gear 625, is preferably detachably secured to stem nut 123 (by means not shown) to facilitate maintenance. Clutch 626 accommodates the opening and closing of the hydrant valves via operating nut 121, but closes these valves when a hydrant nozzle is bare, and thus saves water thereby.

While a turbine type hydraulic motor 690 may require the reduction gear 690*a* shown while the vane type may not, the turbine type is presently preferred because the minimum flow needed to operate a turbine inherently accommodates leakage flow from a worn cap or hose gasket without closing the hydrant. Since a turbine has no pockets or valves that can trap water as does a vane motor, it is also protected against freezing because it is drained by conduit 191 when mounted in the position shown.

Returning now to FIG. 2, ANSI/AWWA C503-82 §3.2.1 requires that the main valve, the hydrant operating mechanism, and the movable parts of the hydrant drain valve be removable without excavation. As is clear from that drawing, all of these parts can be removed from above by using conventional hydrant tools to unscrew valve seat ring 246 from base 210. Because this requirement applies to traditional hydrants as well, it is clear that traditional hydrants can be converted to those of this invention without having to excavate.

The valve assemblies so removed are combinations of new and traditional parts, some of which have not yet been described, and it is convenient to remedy this by describing valve replacement as well.

Main valve 240 is secured to upper main valve plate 248 by a threaded lower main valve plate 242 that is kept from loosening by jamb nut 243, and a flat washer 241 is interposed between main valve 240 and that lower main valve plate as is shown, so that lower plate 242 can be tightened without distorting the main valve. As is clear from the drawing, main valve 240 can be removed and replaced with the aid of a spanner wrench that engages spanner holes 244 in jamb nut 243, and similar holes in lower plate 242, and that valve 240 can be so replaced without disturbing the other elements removed by unscrewing valve seat ring 246, e.g., the pilot valve assembly.

Upper main valve plate 248, as is also clear from the drawing, serves not only the purpose mentioned, but also as the seat for the seal or the pilot valve, the member to which drain valve facings 247 are attached, and the member grooved to accommodate "o" rings 249 as well. Further, as a perusal of AWWA Manual M17 will confirm, plate 248 typically has some means, say the stops 248*a* shown, to limit the downward excursion of the main valve assembly.

The drain valve facings 247 are attached to upper main valve plate 248 by familiar means (not shown), and serve the familiar role required by ANSI/AWWA C502-85 §3.2.11; i.e., positive-operating drain valves that open when the main valve is closed. They also, of course, close off drain holes 245 when the main valve is opened. Since the movable parts of the drain valve are either part of, or attached to, upper main valve plate 248, they too are accessed for servicing as are the other valve, i.e., by unscrewing valve seat ring 246 from base 210 as explained.

The "o" rings 249 are also maintenance items that may require removal and replacement, and this is facilitated by unscrewing pilot valve stem 231 and sliding the main valve assembly off lower stem portion 230. This also facilitates the removal and replacement of spring 234, of pilot valve assembly 220 and the parts associated therewith, and of any screens that may have been installed in lower stem portion 230 to protect the dedicated flow path.

Pilot valve 225 is, like main valve 240, also secured to its upper pilot valve plate 228 by a threaded lower pilot valve plate 222 that is also kept from loosening by a jamb nut 223, and also has a flat washer interposed between the valve and its lower plate for the same purpose. Here, however, the jamb nut is configured to serve as the upper retainer for pilot valve spring 227 as well. Upper pilot valve plate 228 is, like upper main valve plate also grooved to accept "o" rings, here "o" rings 229.

Removal and replacement of the pilot valve follows procedures described for the main valve except that here the smaller diameters of the parts involved may favor wrenches that engage parallel or hexagonal gripping faces over those that engage spanner holes. Because the actual arrangement is a variable of design, gripping faces have been omitted from the drawing. Pilot valve assembly 220, "o" rings 229, and spring 227 can also be replaced by removing jamb nut 226 and lower pilot valve spring retainer 224.

Spring 234 addresses the ANSI/AWWA C502-85 §3.2.1.2 requirement with respect to leakage under "breakaway" conditions as it would be expected to apply to hydrants in accordance with the present invention. In hydrants in which the main valve opens against pressure, it is that pressure which is counted upon to hold the main valve closed under "breakaway" conditions, and that pressure will also, if high enough, hold the pilot valve of the present invention closed as well. Under reduced pressure conditions, however, the weight of parts retained after breakaway, lower stem portion 230 for example, may be great enough to open the pilot valve and result in excessive leakage if conduit 191 is torn loose or severed. Spring 234 addresses this by supporting at least part of the weight of lower stem portion 230.

Returning now to FIG. 1, ANSI/AWWA C502-85 §3.2.9.1 requires that either the threaded stem portion 131 or the stem nut 123 be made of bronze, and not only is it the threaded portion that is preferably made of bronze; the upper stem portion 130 and the lower stem portion 230 are also preferably made of or at least sheathed in that material to eliminate the risk of "o" ring abrasion by corroded steel.

While material selection and the lubricant provided by lubricant chamber 145 will reduce the torque applied to the valve stem when the hydrant is opened or closed, that torque, which in traditional hydrants is resisted by an upper main valve plate that is secured to the stem and transfers the torque on that stem to the main valve seal ring is not so resisted here, and in lieu of some remedy, stem 130 could merely turn along with stem nut 131 and not move down to open or up to close the hydrant. That torque can, however, be resisted here by reconfiguring collar 239 and upper main valve plate 248 to accommodate translation but not rotation of the upper main valve plate with respect to the stem, or preferably by the torque plate 128 shown in FIG. 1 that has a tab that extends radially inward to engage longitudinal slot 138 in the threaded portion 131 of upper stem portion 130.

Figure 5:
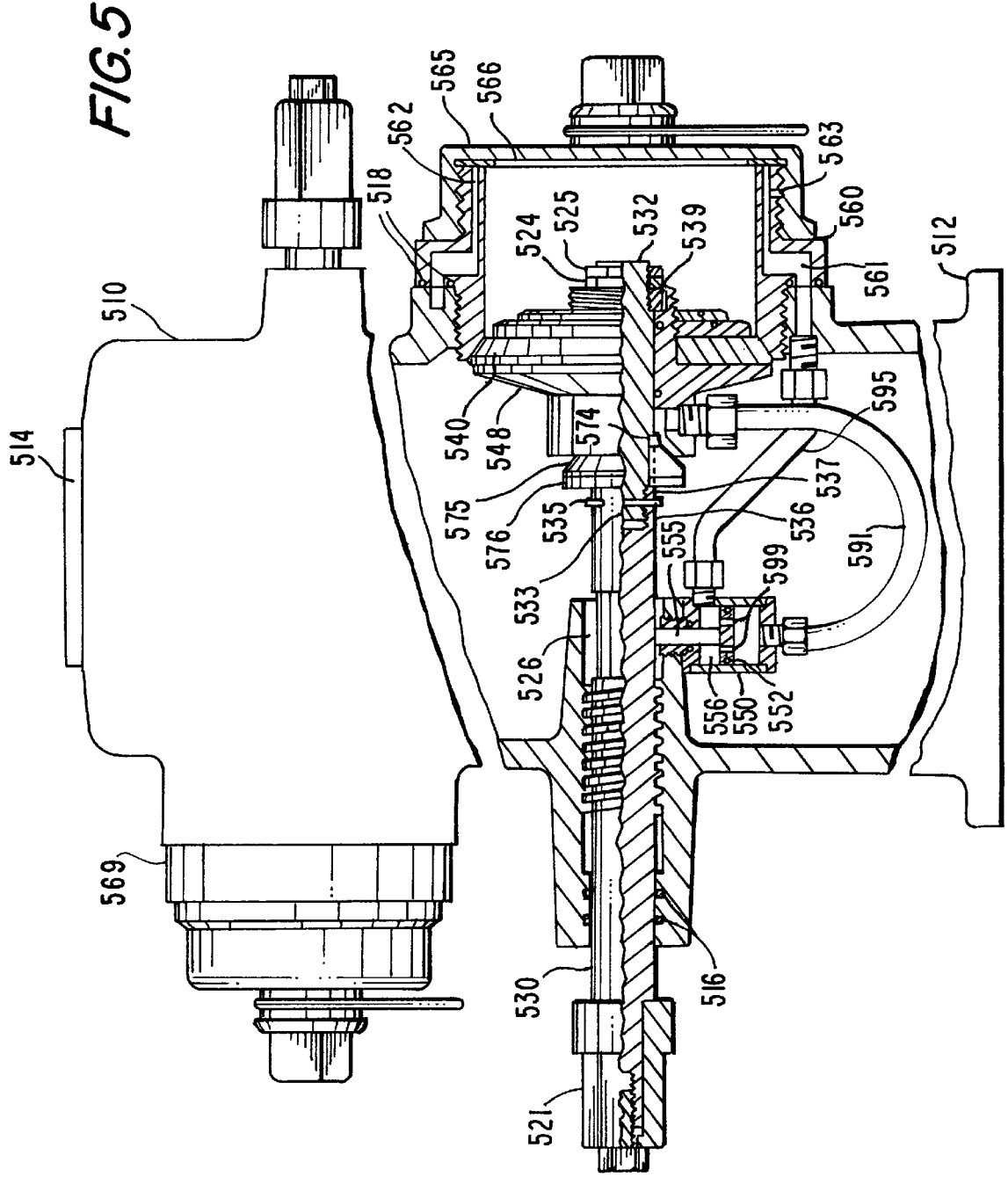
FIG. 5 is a fragmented elevational view, partly in section, of a wet-barrel fire hydrant in accordance with the present invention, and in which a pilot valve is shown opened and the corresponding main valve is shown closed.

The embodiment of FIG. 5 is the body portion 510 of a wet-barrel fire hydrant in accordance with the present invention, and, as is clear from the drawing, that body portion includes not only the hydrant outlet nozzles, but also separate valves for each those nozzles. Body portion 510 also has a mounting flange 512 that is bolted to or is otherwise secured to the corresponding flange on a bury ell (not shown), and the combination of body portion 210 and the bury ell is a wet-barrel fire hydrant in accordance with the present invention.

The bury ell, like the base portion 210 of FIG. 2, supports the aboveground part of the hydrant, say body portion 510. It also connects the hydrant to a water supply via the hydrant lead. Unlike base 210, however, the bury ell has no valves, no drains, and nothing to limit street flooding when the hydrant is destroyed by an out-of-control vehicle. Thus body portion 510 is filled with water at mains pressure, and hence the wet-barrel designation. Wet-barrel hydrants have no drains to protect them against freezing because they are intended for places where winter temperatures are mild, and the draining provisions of the FIG. 3 embodiment have been omitted from the blocking pin actuator 550 of FIG. 5 for the same reason as well.

Wet-barrel hydrants, like their dry-barrel counterparts, typically have one pumper outlet nozzle and two hose outlet nozzles, and while the pumper outlet nozzle 560 and one of the hose outlet nozzles 569 are shown in the drawing, the cutaway portion of FIG. 5 shows only the pumper outlet nozzle and its dedicated valve arrangement in detail because the hose outlet nozzles and their valving arrangements are typically the same as those of the pumper outlet nozzle except for size.

The pumper nozzle valve is opened by rotating the now familiar operating nut 521 counterclockwise. This also rotates stem 530 in the same direction, moving pilot valve opening collar 574 and hence pilot valve 575 to the left. Water is thus admitted into the space between pilot valve 575 and upstream main valve plate 548 which, like upper main valve plate 248 of FIG. 2, is also the pilot valve seat, and then directly into the lower portion of blocking pin actuator 550 via conduit 591. While there appears to be no obvious flow sensor in FIG. 5, piston 552, it should be noted, has through holes 599 in its direction of movement, and these holes, as will be explained, are the functional equivalent of the hole in orifice plate 499.

Assuming a bare nozzle, i.e., that cap 565 has been removed and that no hose has been attached, water will flow through holes 599, into the upper portion of blocking pin actuator 550, into ring manifold 561 via conduit 595, and out the longitudinal holes 562 and the optional radial hole 563. 1 that flow from pilot valve 575 to the gasket face of nozzle 560, which is, of course, via the dedicated flow path defined by the parts just mentioned, is rate-limited by holes 599, the pressure and the resulting force on the bottom side of piston 552 will exceed that on the upper, and piston 552 will move upward and press blocking pin 555 against stem 530. Thus the blocking pin actuator 550 of FIG. 5 is also its own flow sensor. Persons having ordinary skiff in the art will, however, recognize that embodiments like those of FIG. 5 can also be served by flow sensors such as those of FIGS. 3 and 4 if holes 599 are eliminated. Those workers will also recognize that, depending on the blocking pin travel required, a diaphragm or bellows may be a viable alternative to piston 552.

Blocking pin 555 presses against stem 530 when, as mentioned, a nozzle is bare and the pilot valve is opened, and, as is clear from the drawing, presses on the part 526 of stem 530 that has been milled or otherwise configured to resemble a ratchet wheel. Thus pin 555 serves as the pawl part of a pawl-and-ratchet arrangement that blocks stem rotation in the counterclockwise or opening direction, but not in the clockwise or closing direction, when the flow via the dedicated flow path exceeds a predetermined rate, and the only flow from nozzle 560 will be that from holes 562, 563 because main valve 540 is held closed by the water pressure in body portion 510.

If, however, holes 562, 563 are closed off, say by a hose coupling, there will be no flow via the dedicated flow path when the pilot valve is opened, the pressures on either side of piston 552 will be the same, and pin 555 will be retracted by gravity, optional spring 556, or a combination of both, and will allow further rotation of stem 530 in the counterclockwise direction. That further rotation will move main valve opening collar 539 into contact with upstream main valve plate 548, moving main valve 540 away from the inboard end of nozzle 560 which is also its seat, and deliver full flow to the hose.

While valve opening has been explained in detail, valve closing has not. Pilot valve 575 is shown clamped between opening collar 574 and closing collar 576 by a two-part threaded stem assembly in FIG. 5, the downstream stem portion 532 having a threaded male upstream end 533 that engages the matching female portion of the downstream end 537 of upstream stem portion 536, relative rotation between these stem portions being prevented by cotter pin 535. Thus when pilot valve 575 is closed by the clockwise rotation of stem 530, that valve will also so rotate and be loaded in shear and either rub and wear or distort when it is finally closed. This shear loading and its undesirable consequences can, however, be eliminated by substituting an alternate version of the pilot valve assembly of FIG. 2, i.e., one having a simple jamb nut instead of the spring retaining jamb nut 223 for pilot valve 575, and adjusting the spacing between opening collar 574 and closing collar 576 to accommodate free rotation but only minimal translation of the valve assembly; by Teflon coating opening collar 574 or a washer adjacent thereto and adjusting the collar spacing as mentioned, or, if the flow to be described can be tolerated, by eliminating the pilot valve entirely.

Pilot valve 575 delivers water to blocking pin actuator 550 via conduit 591, and if valve 575, conduit 591, and radial holes 563 are omitted, nozzle 560 is capped, and cap gasket 566 closes off longitudinal holes 562 there will, of course, be no flow from the hydrant. If, however, the nozzle cap is removed, flow via the dedicated path from the inlet of blocking pin actuator 550 to the downstream end of holes 562 will be limited by holes 599 in piston 522, and will be small enough so that a hose can be attached to the bare nozzle despite that flow. With the hose attached, flow via the dedicated path will again be blocked by a gasket, i.e., the one for the hose, and pin 555 will retract, allowing the counterclockwise rotation of stem 530 that opens the main valve. To insure positive closure of the main valve in any such arrangement, the downstream end of upstream stem portion 536 could be extended along the dashed line as shown and collar 576 omitted, and if so, collar 574 would serve as the closing collar for the main valve.

Although firefighters may object to this option because they normally interpret leakage when a cap is loosened as a warning that the valve that controls full flow has either been opened or has failed, it does make it clear that a FIG. 5 embodiment of this invention will operate as expected should the pilot valve, conduit 591, or both, fail. With the embodiments of FIGS. 1 and 2, however, failure of the pilot valve would result in leakage into the lower barrel and out the drain holes, while the failure of conduit 191 would result in a hydrant that operates traditionally. Since hydrants that operate traditionally can deliver full flow when their caps are removed, attempts to obtain such flow by vandalizing conduit 191 via the outlet nozzles can be thwarted say by grids, crossbars, etc. cast into or otherwise secured to the bore of the hydrant outlet nozzles.

The FIG. 5 drawing shows an optional dome cap 514 that can be removed for servicing and inspection once valves external to the hydrant have been closed to isolate it from the mains, and if inspection or leakage makes it clear that valves or "o" rings need replacement, these parts can be accessed by removing both the appropriate outlet nozzle and the corresponding operating nut, rotating stem 530 clockwise until conduit 591 is accessible, disconnecting that conduit, and further rotating the stem until it is free of the body portion of the hydrant. If the blocking pin actuator needs to be replaced and it cannot be accessed by removing optional dome cap 514, it too can be accessed by removing the valve stem.

The main valve assembly is either removed by removing cotter pin 525, unscrewing one stem portion from the other, removing the pilot valve and its collars, and finally, removing the main valve assembly, or, if only the main valve assembly needs to be replaced, by removing jamb nut 525, nut 524, and collar 539. (While wet-barrel valve assemblies are typically secured to stems by slotted nuts that are locked with cotter pins, the nut, jamb nut, and collar arrangement shown in the drawing is preferred because the water saver feature of the present invention might otherwise be defeated by wedging an improvised spacer between the cotter pin and the main valve assembly.) Any "o" rings accessible with the stem removed would also preferably be replaced, and these include stem guide "o" rings 516, outlet nozzle "o" rings 518, and those accessible when the valve assemblies are removed. Because the removal and replacement of valve elements has been explained in detail with reference to FIG. 2, no further explanation is needed here.

The new, novel and useful features of this invention have been described in detail with reference to embodiments of dry-barrel and wet-barrel fire hydrants, and persons having ordinary skill in the art will recognize their applicability to other hydrant configurations and other hydrant valving and flow sensing arrangements as well. Thus the embodiments shown in the drawings and described herein are intended to be illustrative rather than limiting, the actual scope of the invention being defined by the appended claims.

I claim:

1. An apparatus for use in and for limiting unauthorized water flow from a fire hydrant of the type having an outlet nozzle having a bore for accommodating water flow from said hydrant, the apparatus comprising:

at least one hole in said outlet nozzle, said hole having a downstream end which may be obstructed by a device securable to said outlet nozzle;

a pilot valve for controlling water flow to said at least one hole;

a dedicated water flow path from said pilot valve to said downstream end of said at least one hole;

a water flow sensing means for sensing water flow via said dedicated water flow path;

a main valve for controlling water flow to said outlet nozzle bore;

a valve operating means for opening and closing said pilot valve and said main valve, said valve operating means opening said valves sequentially with said pilot valve opening first; and a stop means for preventing said valve operating means from opening said main valve when said water flow sensing means senses a water flow exceeding a predetermined rate.

2. The apparatus of claim 1, wherein said predetermined rate is indicative of substantially unobstructed water flow through said downstream end of said hole.

3. The apparatus of claim 1, further comprising a plurality of outlet nozzles, each having at least one hole therein having a downstream end which may be obstructed by a device securable to its respective outlet nozzle, said plurality of nozzles being fed by a common pilot valve, a common main valve, and in common by at least the portion of said dedicated water flow path from said common pilot valve to an outlet of said water flow sensing means.

4. The apparatus of claim 1, further comprising a plurality of outlet nozzles, each having a hole therein having a downstream end which may be obstructed by a device securable to its respective outlet nozzle, each outlet nozzle being served by its own pilot valve, its own dedicated water flow path, its own water flow sensing means, its own main valve, its own valve operating means, and its own stop means.

5. The apparatus of claim 1, wherein said water flow sensing means senses the pressure at a point upstream of and at a point downstream of a restriction in said dedicated water flow path.

6. The apparatus of claim 1, further comprising an impact tube and a diffusion tube in said dedicated water flow path, and wherein said water flow sensing means senses the pressure in at least one of said impact tube and said diffusion tube and at least one of (a) the pressure in the other of said impact tube and said diffusion tube and (b) the pressure in said dedicated water flow path.

7. The apparatus of claim 1, wherein said stop means is a blocking pin actuator that extends a pin that engages a device selected from the group consisting of a stop, a finger plate, and at least one ratchet-like tooth on said valve operating means.

8. The apparatus of claim 1, further comprising a seal valve, and wherein said valve operating means also opens and closes said seal valve, said valve operating means opening said valves in the sequence seal valve, then pilot valve, then main valve.

9. The apparatus of claim 1, further comprising a plurality of outlet nozzles, each having a hole therein having a downstream end which may be obstructed by a device securable to its respective outlet nozzle, the flow from at least one of said nozzles being intended to be road-directed, and wherein the cross-sectional area of said hole in said road-directed nozzle exceeds the cross-sectional area of a restriction in said dedicated water flow path.

10. The apparatus of claim 9, wherein said restriction comprises the throat of a venturi in said dedicated water flow path.

11. The apparatus of claim 1, wherein said at least one hole is in at least one of a gasket face and a cap securing means.

12. A process for limiting the flow of water from a fire hydrant having a pilot valve, a main valve, and at least one outlet nozzle having at least one hole having a downstream end which may be obstructed by a device securable to said outlet nozzle, the process comprising the steps of:

operating a valve operating means common to said pilot valve and said main valve for opening said valves in the sequence pilot valve first;

delivering water to the downstream end of said hole via a dedicated water flow path from said pilot valve to said downstream end of said hole;

sensing water flow via said dedicated water flow path; and preventing the opening of said main valve when said sensed water flow exceeds a predetermined rate.

13. The process of claim 12, wherein said step of preventing the opening of said main valve comprises preventing the opening of said main valve when said sensed water flow exceeds a predetermined rate indicative of substantially unobstructed water flow through said downstream end of said hole.

14. The process of claim 12, wherein said sensing step comprises sensing the pressure at a point upstream of and at a point downstream of a restriction in said dedicated water flow path.

15. The process of claim 12, wherein said sensing step comprises sensing the pressure in at least one of an impact tube and a diffusion tube in said dedicated water flow path and at least one of (a) the pressure in the other of said impact tube and said diffusion tube and (b) the pressure in said dedicated water flow path.

16. The process of claim 12, wherein the step of preventing the opening of said main valve comprises preventing said opening by employing a blocking pin actuator that extends a pin that engages a device selected from the group consisting of a stop, a finger plate, and at least one ratchet-like tooth on said valve operating means.

17. The process of claim 12, wherein said hydrant further comprises at least one seal valve, and wherein said operating step comprises operating said valve operating means for opening and closing said seal valve for opening said valves in the sequence seal valve, then pilot valve, then main valve.

18. The process of claim 12, further comprising the step of selecting the cross-sectional area of said at least one hole to exceed the cross-sectional area of a restriction in said dedicated water flow path.

19. The process of claim 18, wherein said selecting step comprises selecting the cross-sectional area of said at least one hole to exceed the cross-sectional area of a throat of a venturi in said dedicated water flow path.

20. An apparatus for use in and for limiting unauthorized water flow from a fire hydrant of the type having an outlet nozzle having a bore for accommodating water flow from said hydrant, the apparatus comprising:

at least one hole in said outlet nozzle, said hole having a downstream end which may be obstructed by a device securable to said outlet nozzle;

a water flow sensing means for sensing water flow via said dedicated water flow path;

a dedicated water flow path from at least the inlet of the water flow sensing means to the downstream end of said at least one hole a main valve for controlling water flow to said at least one outlet nozzle; and a stop means for preventing the opening of said main valve when said water flow sensing means senses a water flow exceeding a predetermined rate.

21. The apparatus of claim 20, wherein said at least one outlet nozzle comprises a plurality of outlet nozzles, each outlet nozzle having at least one hole therein having a downstream end which may be obstructed by a device securable to said outlet nozzle, and further comprising a main valve for each outlet nozzle.

22. The apparatus of claim 20, wherein said predetermined rate is indicative of substantially unobstructed water flow through said downstream end of said hole.

23. A process for limiting the flow of water from a fire hydrant of the type having a main valve for controlling water flow to an outlet nozzle, said outlet nozzle having at least one hole therein having a downstream end which may be obstructed by a device securable to said nozzle, and a water flow sensor in a dedicated water flow path, said dedicated water flow path extending from at least the inlet of said water flow sensor to the downstream end of said at least one hole, the process comprising the steps of:

delivering water to the downstream end of said at least one hole via said dedicated water flow path;

sensing the water flow in said dedicated water flow path;

preventing the opening of said main valve when the water flow sensed by said water flow sensor exceeds a predetermined rate.

24. The process of claim 23, wherein said step of preventing the opening of said main valve comprises preventing the opening of said main valve when said sensed water flow exceeds a predetermined rate indicative of substantially unobstructed water flow through said downstream end of said hole.

25. An apparatus for use in and for limiting unauthorized water flow from a fire hydrant of the type having an outlet nozzle having a bore for accommodating water flow from said hydrant, the apparatus comprising:

at least one hole in said outlet nozzle, said hole having a downstream end which may be obstructed by a device securable to said outlet nozzle;

a pilot valve for controlling water flow to said at least one hole;

a dedicated water flow path from said pilot valve to said downstream end of said at least one hole;

a water flow sensing means for sensing water flow via said dedicated water flow path;

a main valve for controlling water flow to said outlet nozzle bore;

at least one seal valve;

a valve operating means for opening and closing said pilot valve, said main valve and said seal valve, said valve operating means opening said valves sequentially with said seal valve opening first, then said pilot valve, then said main valve; and a stop means for preventing said valve operating means from opening said main valve when said water flow sensing means senses a water flow exceeding a predetermined rate.

26. The apparatus of claim 25, further comprising a plurality of outlet nozzles, each having at least one hole therein having a downstream end which may be obstructed by a device securable to its respective outlet nozzle, said plurality of nozzles being fed by a common seal valve, a common pilot valve, a common main valve, and in common by at least the portion of said dedicated water flow path from said common pilot valve to an outlet of said water flow sensing means.

27. The apparatus of claim 25, wherein said predetermined rate is indicative of substantially unobstructed water flow through said downstream end of said at least one hole.

28. A process for limiting the flow of water from a fire hydrant having a seal valve, a pilot valve, a main valve, and at least one outlet nozzle having at least one hole therein having a downstream end which may be obstructed by a device securable to said outlet nozzle, the process comprising the steps of:

operating a valve operating means for opening said seal valve, said valve operating means being common to said seal valve, said pilot valve and said main valve for opening said valves in the sequence seal valve first, then said pilot valve, then said main valve;

opening said pilot valve;

delivering water to the downstream end of said at least one hole via a dedicated water flow path from said pilot valve to said downstream end of said hole;

sensing water flow via said dedicated water flow path; and preventing the opening of said main valve when said sensed water flow exceeds a predetermined rate.

29. The process of claim 28, wherein said step of preventing the opening of said main valve comprises preventing the opening of said main valve when said sensed water flow exceeds a predetermined rate indicative of substantially unobstructed water flow through said downstream end of said hole.

30. An apparatus for use in and for limiting unauthorized water flow from a fire hydrant of the type having an outlet nozzle having a bore for accommodating water flow from said hydrant, the apparatus comprising:

at least one hole in said outlet nozzle, said hole having a downstream end which may be obstructed by a device securable to said outlet nozzle;

a pilot valve for controlling water flow to said at least one hole;

a dedicated water flow path from said pilot valve to said downstream end of said at least one hole;

a water flow sensing means for sensing water flow via said dedicated water flow path;

a main valve for controlling water flow to said outlet nozzle bore;

a valve operating means common to said pilot valve and said main valve for opening and closing said pilot valve and said main valve, said valve operating means opening said valves sequentially with said pilot valve opening first; and a closing means for closing said main valve when said water flow sensing means senses a water flow exceeding a predetermined rate.

31. The apparatus of claim 30, wherein said closing means comprises a hydraulic motor.

32. The apparatus of claim 31, wherein said hydraulic motor is one of a vane type hydraulic motor and a turbine.

33. The apparatus of claim 30, wherein said predetermined rate is indicative of substantially unobstructed water flow through said downstream end of said hole.

34. The apparatus of claim 30, further comprising a plurality of outlet nozzles, each having at least one hole therein having a downstream end which may be obstructed by a device securable to its respective outlet nozzle, said plurality of nozzles being fed by a common pilot valve, a common main valve, and in common by at least the portion of said dedicated water flow path from said common pilot valve to an outlet of said water flow sensing means.

35. The apparatus of claim 30, further comprising a plurality of outlet nozzles, each having a hole therein having a downstream end which may be obstructed by a device securable to its respective outlet nozzle, each outlet nozzle being served by its own pilot valve, its own dedicated water flow path, its own water flow sensing means, its own main valve, its own valve operating means, and its own closing means.

36. The apparatus of claim 30, further comprising at least one seal valve, and wherein said valve operating means also operates said seal valve and opens said valves in the sequence seal valve first, then pilot valve, then main valve.

37. A process for limiting the flow of water from a fire hydrant having a pilot valve, a main valve, and at least one outlet nozzle having at least one hole therein having a downstream end which may be obstructed by a device securable to said outlet nozzle, the process comprising the steps of:

operating a valve operating means for opening said pilot valve, said valve operating means being common to said pilot valve and said main valve for opening and closing said valves, said valves being opened in the sequence pilot valve first;

delivering water to the downstream end of said at least one hole via a dedicated water flow path from said pilot valve to said downstream end of said hole;

sensing water flow via said dedicated water flow path; and closing said main valve when said sensed water flow exceeds a predetermined rate.

38. The process of claim 36, wherein said steps of sensing water flow and closing said main valve comprise employing a hydraulic motor.

39. The process of claim 36, wherein said fire hydrant further comprises a seal valve, and wherein said step of operating said valve operating means comprises operating a valve operating means common to said seal valve, said pilot valve and said main valve for opening and closing said valves, said valves being opened in the sequence seal valve, then pilot valve, then main valve.

40. The process of claim 36, wherein said step of closing said main valve comprises closing said main valve when said sensed water flow exceeds a predetermined rate indicative of substantially unobstructed water flow through said downstream end of said hole.

* * * * *

UNITED STATES PATENT AND TRADEMARK OFFICE
CERTIFICATE OF CORRECTION

PATENT NO. : 6,058,957
DATED : May 9, 2000
INVENTOR(S) : Richard Honigsbaum

Page 1 of 2

It is certified that error appears in the above-indentified patent and that said Letters Patent is hereby corrected as shown below:

On the cover page, under numeric identifier [76], change "Gardens 241 Passaic Ave" to -- Gardens 245 Passaic Ave--.

On the cover page, under OTHER PUBLICATIONS, change "AWA Standard" to --AWWA Standard--.

Column 2, line 10, change "gasket faces nozzles" to --nozzle gasket faces--.

Column 5, line 8, change "cut away)." to --cut away.)--.

Column 7, line 39, change "NG. 6" to --FIG. 6--.

Column 7, line 45, add a period after "690a".

Column 10, line 28, change "1" to --If--.

Column 14, line 24, add a semicolon after "at least one hole"--.

In the drawings, Sheet 2, Fig. 2, the line referred by numeric label 241 should be a heavier line representing a flat washer interposed between main valve 240 and lower plate 242.

In the drawings, Sheet 3, Fig. 3, impact tube 197 and diffusion tube 198 are two separate tubes, and are not interconnected inside flow sensor 190. The lower portion of Fig. 3, as corrected, is shown below:

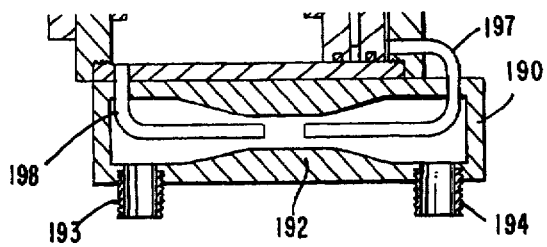

UNITED STATES PATENT AND TRADEMARK OFFICE
CERTIFICATE OF CORRECTION

PATENT NO. : 6,058,957
DATED : May 9, 2000
INVENTOR(S) : Richard Honigsbaum

Page 2 of 2

It is certified that error appears in the above-indentified patent and that said Letters Patent is hereby corrected as shown below:

In the drawings, Sheet 4, Fig. 5, there should be an optional spring referenced by numeric label 556. The lower portion of Fig. 5, as corrected, is shown below:

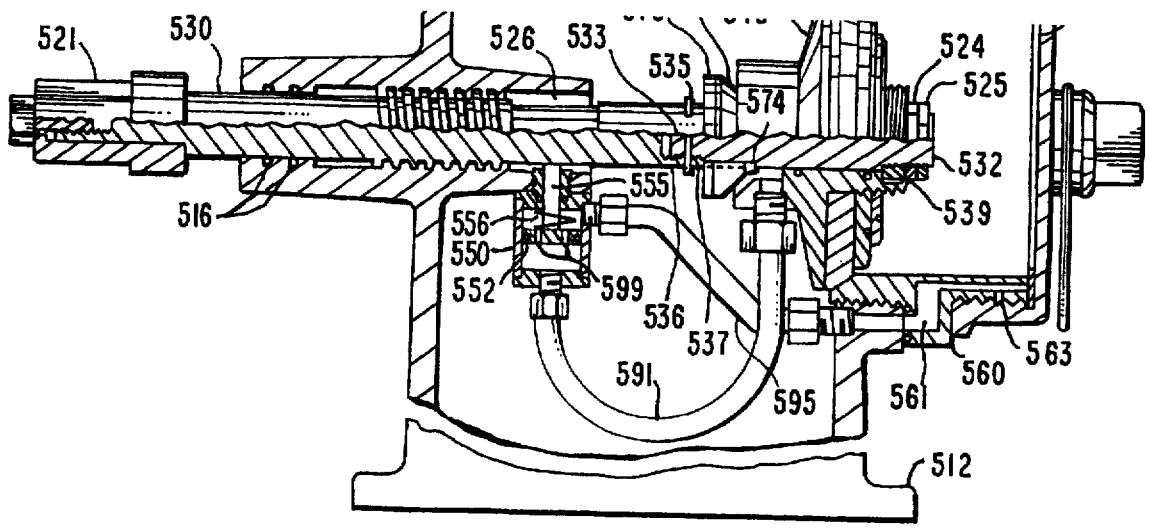

Signed and Sealed this

Seventeenth Day of April, 2001

Attest:

NICHOLAS P. GODICI

Attesting Officer

Acting Director of the United States Patent and Trademark Office